Feb. 5, 1952  E. O. KEIZER ET AL  2,584,272
RADIO-FREQUENCY BOLOMETER WATTMETER
Filed July 12, 1946  2 SHEETS—SHEET 1
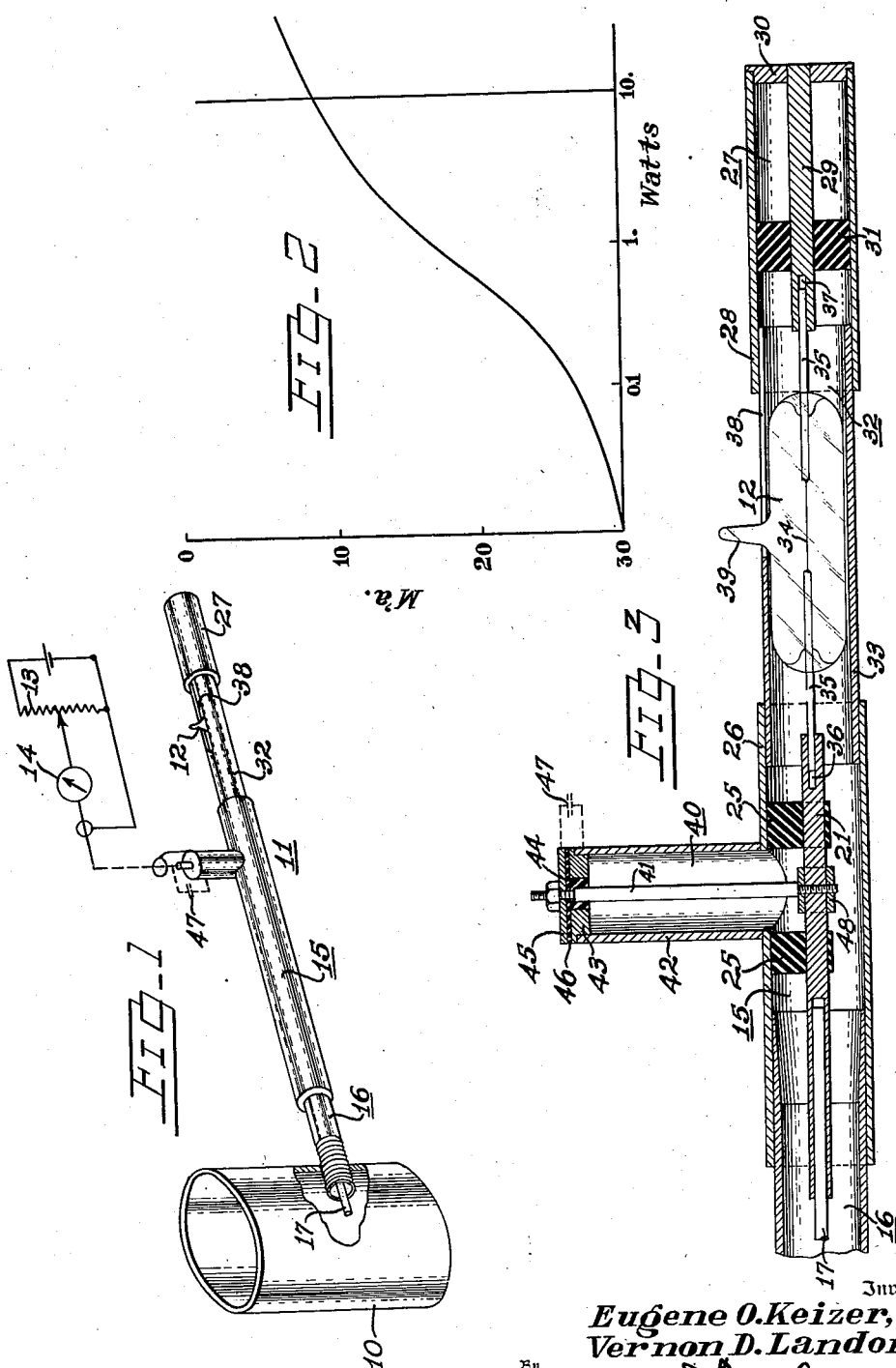
Inventor
*Eugene O. Keizer, and
Vernon D. Landon*
Attorney

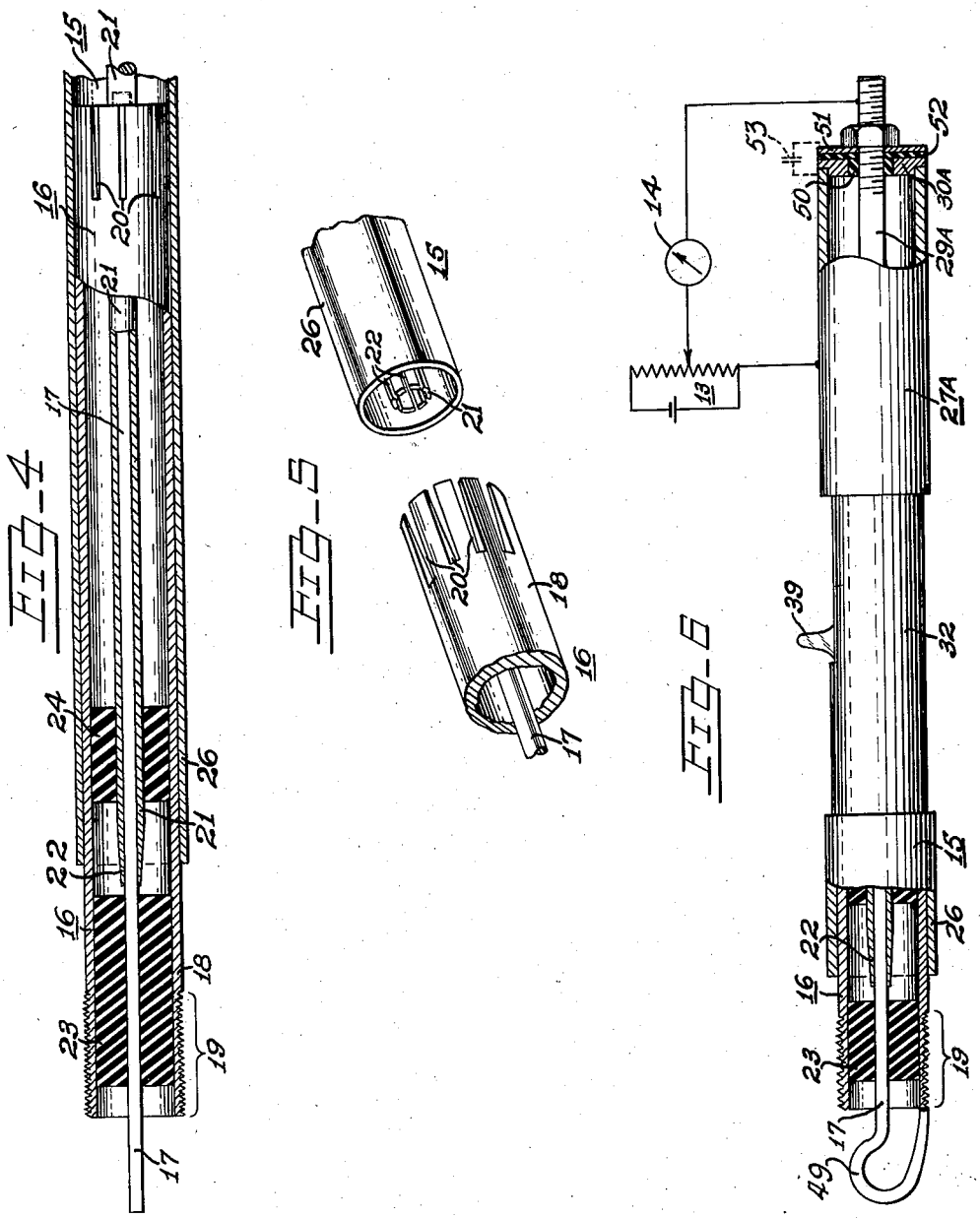

Patented Feb. 5, 1952 2,584,272

UNITED STATES PATENT OFFICE 2,584,272

RADIO-FREQUENCY BOLOMETER WATTMETER

Eugene O. Keizer and Vernon D. Landon, Princeton, N. J., assignors to Radio Corporation of America, a corporation of Delaware Application July 12, 1946, Serial No. 683,055

8 Claims. (Cl. 171—95)

This invention relates to measurement of power at radio frequencies and particularly to wattmeter systems and components suited for use at ultra-high frequencies.

The measurement of power at short wavelengths, for example of the order of centimeters, has presented unusual difficulties and systems previously devised for that purpose have in the main been unsatisfactory. Many were of complex construction unsuited for field use and in operation required great care and skill to attain reliable measurements under conditions encountered in the field. Others were suited only for restricted range of measurement, so necessitating duplication of equipment to cover the required or expected range of power to be measured. Still others were inherently inaccurate because of randomly variable or uncontrollable factors or need for recalibration by use of special equipment not available in the field.

In accordance with the present invention, high-frequency power is measurable over a wide range by a wattmeter system which essentially need comprise no more than a section of concentric line, a bolometer tube or equivalent, and a direct-current meter responsive to changes in resistance of the bolometer filament. All high-frequency fields and wattmeter components producing them are within the concentric line and so effectively isolated from influence by or upon external conditions or environment. For checking or recalibration purposes, only a few and commonly available direct-current components are required.

The invention further resides in features of construction, combination and arrangement hereinafter described and claimed.

For more detailed understanding of the invention, reference is made to the accompanying drawings, in which:

Figure 1 shows a wattmeter system with the concentric line unit in perspective and other circuit elements in schematic form;

Figure 2 is a curve referred to in discussion of the wattmeter of Figure 1;

Figure 3 is a sectional view, on enlarged scale, of a part of the concentric line unit of Figure 1;

Figure 4 is a cross-sectional view showing the remainder of the concentric line of Figure 1 and including some of the construction shown in Figure 3;

Figure 5 in perspective illustrates the construction of the terminal portions of concentric line elements; and Figure 6 is a side elevational view, partly in section, of a modification of the elements shown in Figure 3.

Referring to Figure 1, the cavity 10 generically represents a source whose radio-frequency output is to be determined, for example, an oscillator or radio-frequency power amplifier used in a transmitter or test equipment. The concentric line 11 suitably coupled to the source of power provides for flow of high-frequency energy therefrom to the load—the filament of bolometer tube 12. The inner conductor 17 of the line 11 may, as shown in Figure 1, extend into the cavity for transfer of energy to the line by capacity coupling, or the transfer may be effected by inductive coupling, for example, by the loop 49 of Figure 6.

The bolometer tube 12 is disposed within the line 11 with its filament, a fine platinum wire, forming a portion of the inner conductor thereof. Thus, the energy-dissipation element of the wattmeter and the energy path thereto from power source 10 are within the outer conductor of line 11 and isolated thereby from all circuits or circuit components external to the line.

The bolometer filament, whose resistance changes as a direct function of the radio-frequency power delivered to the line from the source 10, is in circuit with a variable resistance 13, traversed by direct current from a suitable source, such as a battery. The bolometer filament and milliammeter 14, in series therewith, are connected in shunt to a portion of the potentiometer resistance 13 selected by adjustment of its contact. The flow of radio-frequency currents in the resistance 13 and meter 14, that is, in that portion of the measuring circuit which is external to the concentric line, is prevented as hereinafter specifically explained. The calibration of the measuring system may be effected with direct current using, for example, only a battery, a direct-current voltmeter, a direct-current milliammeter and a decade resistance box. After calibration, and preliminary to a measurement of high-frequency power, the potentiometer resistance 13 is so adjusted that the meter indicates a maximum or predetermined current reading for zero radio-frequency input to the line and thereafter upon supply of radio-frequency power to the line, the meter readings may be translated in terms of radio-frequency power of the source 10.

A typical calibration curve using a potentiometer having the maximum value of 50 ohms, a battery supplying 2 volts, and a milliammeter 14 having maximum reading of 30 milliamperes is shown in Figure 2. As apparent from the curve, this arrangement is highly sensitive to small amounts of power and yet is useful for reading from the same scale powers of relatively large magnitude; specifically, powers as low as those of the order of 0.01 watt and as high as those of the order of 15 watts may be read with reasonable accuracy from the same scale, although their ratio is 1:1500.

In operation, the coupling between the line 11 and the source 10 is varied to effect maximum dissipation of energy in the bolometer lamp. For that purpose, the input end of the line may be threaded, as shown in Figure 1, to permit the probe 17 or projecting end of the inner conductor to be moved into different positions within the cavity. To adapt the wattmeter for use over a range of frequencies, provision is made to adjust its length for tuning of the line as a whole for maximum dissipation in the bolometer filament which is located about one-half wavelength from the closed or shorted end of the line at the mean frequency of the range of adjustment.

More specifically, the line 11 comprises the main section 15 which telescopically receives a slidable extension 16, adjustable by the operator until maximum current to the load is indicated by meter 14. All wattmeter components touched by the operator are at the same radio-frequency potential and consequently the adjustments are made without extraneous disturbance to any of the power-transfer relations during continued operation of source 10. Therefore, in use of the wattmeter, the operations are merely adjustment in length of the line 11 for tuning and variations of coupling to effect maximum reading of the meter 14. Upon performance of these two simple operations which are not affected by change in position of the operator or any of the extraneous equipment, the power output may be directly read from the meter 14 or from a calibration curve, such as Figure 2. The arrangement as thus far described is simple in construction and operation, has a wide range of measurement, neither produces stray fields nor is affected by them if present, and the order of accuracy is satisfactory for the class of measurements involved, the percentage of error being roughly constant throughout the entire range of measurement.

The slidable section 16 of the line 11, Figures 3 and 4, comprises the concentric conductors 17 and 18, the former a rod supported axially of the outer tubular conductor 18 by a plug of styrol or other suitable insulation. At the output end of the extension 16, the outer conductor 18 is provided with a plurality of slots 20, Figure 5, to form spring fingers which afford good electrical contact between the outer conductor 18 of the slidable extension and the outer conductor of the main section 15. The inner conductor 21 of the main section is tubular, at least at its input end, to receive the inner conductor section 17 of the slidable extension 16 of the line; to insure good electrical contact between these two sections of the inner conductor of line 11, the input end of the conductor 21 is provided with slots 22, so to form spring fingers which press against the inner conductor section 17 of the slidable line extension 16. To support and guide the input end of inner conductor section 21, there is provided a second block 24 of styrol or other suitable insulation which is suitably secured within the extension 16 to the outer conductor 18 thereof and is provided with a central opening of diameter suitable slidably to receive the conductor 21.

Within the main section 15 of line 11 the inner conductor 21 is attached to and supported by a pair of spaced blocks 25, of styrol or other suitable insulation, which are secured to the inner surface of the outer conductor 26.

To facilitate insertion and removal of the bolometer tube 12, the line 11 is provided with a removable section 27 comprising the tubular outer conductor 28 and the shorter inner conductor 29 terminating at the closed end of the line formed by disc 30 and supported by the washer or disc 31 of styrol or other suitable insulating material suitably secured to or snugly engaging the inner surface of outer conductor 28. The removable section 27 of line 11 is disengageable from the bolometer section 32 of the line, whose outer conductor 33 forms a continuation of the outer conductor 26 of the main section 15 of the line and of outer conductor 28 of the removable section 27 of the line. The inner conductor of section 32 of line 11 is formed by the bolometer filament 34 and the terminals 35 extending therefrom at opposite ends of the bolometer tube 12. These terminals are received by the sockets or axial openings 36 and 37 at the output and input ends respectively of the inner conductor sections 21 and 29 of the main and removable line sections 15 and 27 respectively. The outer conductor 33 of the section 32 is provided with a slot 38 to afford clearance for the exhaust nipple 39 of the bolometer tube 12 which may, for example, be an Aerolux AH756. The lengths of the sections 32 and 27 are such that, as above mentioned, the center of the bolometer filament is about one-half wavelength from the closed end 30 of the line, thus to minimize variation of the current density along the length of the filament.

To provide for connection of the bolometer filament in the direct-current measuring circuit including resistor 13 and meter 14, and yet prevent leakage of radio-frequency current from the concentric line, there is utilized the stub line 40 comprising an inner conductor 41 which terminates interiorly of line 11 at its connection with the inner conductor 21 of the main section 15 of the line, and a tubular outer conductor 42 which terminates at the junction with the outer conductor 26 of the same section of the line. The other end of the stub line is closed, so far as high-frequency currents are concerned, by the disc or cap 43. The length of the stub line 40 is an odd number of quarter wavelengths long, preferably one quarter wavelength long, so that the stub line, as seen at its input end by the concentric line, is of very high impedance at output frequencies of source 10.

For its connection to the external measuring circuit, the inner conductor 41 extends through the closed end 43 of the line and is insulated therefrom, so far as direct current is concerned, by the sleeve 44. At the closed end of the line 40, the conductor 41 is connected to the cap 43, so far as high-frequency currents are concerned, by the by-pass condenser 47, formed by the metal disc or plate 45 and the disc 46 of mica or other suitable insulating material interposed between the disc 45 and the end cap 43 of the line. At its input junction the inner conductor 41 engages the sleeve 48 which surrounds the inner conductor 21 of line 11, the sleeve 48 coacting with the stub line to afford a band-pass characteristic suited for the range of frequencies at which the wattmeter is to be used.

For inductively coupling the concentric line 11 to a source of power, there may be used the modified construction shown in Figure 6 in which the inner conductor 17 of Figure 4 is connected to, or formed into, a coupling loop 49. In either case, there is provided a loop 49 whose terminals are respectively connected to the inner and outer conductors of the slidable section 16. In this modification, the by-pass condenser 47 or equivalent is omitted but a by-pass condenser 53 having this same function is provided at the point of feedthrough to the bolometer filament from the external measuring circuit. More specifically, in this modification the removable end section 27 of Figure 3 is replaced by the removable end section 27A, Figure 6, having an end disc 30A insulated, for direct current, from the inner conductor 29A by the insulating sleeve 50. The metal disc 51 together with the disc 52 of dielectric and the end cap 30A of the line section 27A, form the aforesaid by-pass condenser 53 which precludes or minimizes the flow of radio-frequency energy from the line 11 to the external portion of the direct-current indicating circuit.

Although preferred wattmeter arrangements have been illustrated and described, it shall be understood the invention is not limited thereto but that changes and modifications may be made, all however, within the scope of the appended claims.

We claim as our invention:

1. A high-frequency wattmeter unit comprising a concentric line having separable sections whose inner conductor members terminate short of one another leaving a gap in the inner conductor of said line, and a single-electrode bolometer tube removably surrounded by the outer conductor of one of said sections and having terminals at its opposite ends respectively engaging the ends of said inner conductor members to close said gaps and to include the bolometer filament in the inner conductor of said line.

2. A high-frequency wattmeter unit comprising a concentric line having two spaced sections, a tubular conductor slidably engaging the outer conductors of said sections to comprise therewith the outer conductor of said line, and a single-electrode bolometer tube removably disposed within said outer conductor and whose filament terminals engage the inner conductors of said sections to comprise therewith the inner conductor of said line.

3. A high-frequency wattmeter unit comprising a concentric line having at one end a telescopic section adjustable to tune the line, having at its other end a section removable for insertion of a bolometer tube whose filament is to be included in the inner conductor of the line, and having intermediate its ends a stub line for connecting or coupling said line to an external circuit.

4. A high-frequency wattmeter unit comprising a concentric line having at one end a telescopic section adjustable to tune the line, having at its other end a shorted-end section removable for insertion of a bolometer tube whose filament is to be included in the inner conductor of the line, and having intermediate its ends a stub line with an insulated inner conductor connected to said bolometer filament.

5. A high-frequency wattmeter unit comprising a concentric line having at one end a telescopic section adjustable to tune the line, having at its other end a section removable for insertion of a bolometer tube whose filament is to be included in the inner conductor of the line, and having intermediate its ends a stub line, said stub line and one end of said concentric line being provided with means for connection to an external measuring circuit and an external source of high frequency.

6. In a radio-frequency wattmeter of the type including a direct-current measuring circuit, a coaxial line adapted to receive radio-frequency power at one end and to be connected to said direct-current measuring circuit at a point remote from said end, said line having an outer hollow conductor extending the length thereof and an inner conductor comprising rod sections extending toward one another from opposite ends of the line with their adjacent ends spaced from one another, and a bolometer tube snugly received within said outer conductor and having a filament extending axially thereof with terminals respectively engaged by said spaced ends of the rod sections to complete said inner conductor for absorption of radio-frequency power and for changing the resistance of said direct-current circuit as a function of the absorbed power.

7. A high-frequency wattmeter unit of the type including a direct-current measuring circuit, comprising a resonant concentric line having separable sections whose inner conductor members terminate short of one another leaving a gap in the inner conductor of the line at an integral number of half-wavelengths from the closed end of one of said sections, a bolometer tube insertable in said line and whose filament closes said gap for dissipation by the filament of high-frequency energy fed to the open input end of the other of said sections, and a concentric stub line joining said resonant line between said input end thereof and the bolometer tube to provide to said filament a connection to said direct-current measuring circuit which presents high impedance to said high-frequency energy.

8. A high-frequency wattmeter as in claim 1 in which the electrical length of the concentric line is adjustable over a range of frequencies and in which an effective portion of the bolometer filament when included in the inner conductor of said line is about one-half wavelength from an end of said line at the mean frequency of said range so as to obtain maximum dissipation in the bolometer filament.

EUGENE O. KEIZER.
VERNON D. LANDON.

REFERENCES CITED

The following references are of record in the file of this patent:

UNITED STATES PATENTS

| Number | Name | Date |
|---|---|---|
| 2,106,713 | Bowen | Feb. 1, 1938 |
| 2,365,207 | Moles | Dec. 19, 1944 |
| 2,399,481 | George | Apr. 30, 1946 |
| 2,411,553 | Ramo | Nov. 26, 1946 |
| 2,414,499 | Webber | Jan. 21, 1947 |
| 2,417,820 | Ginzton | Mar. 25, 1947 |
| 2,315,671 | Tawney | Apr. 6, 1947 |

FOREIGN PATENTS

| Number | Country | Date |
|---|---|---|
| 545,999 | Great Britain | June 23, 1942 |